March 5, 1968  P. J. E. FORSYTH ETAL  3,371,407
METHOD OF PRODUCING A COMPOSITE
METALLIC MATERIAL BILLET
Filed Feb. 15, 1965  2 Sheets-Sheet 1
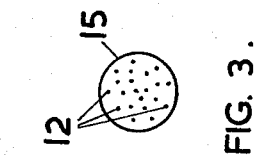
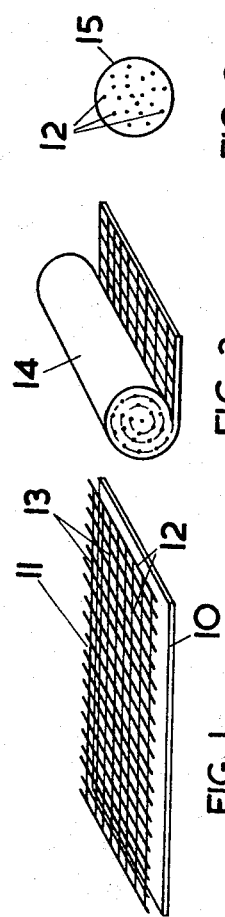
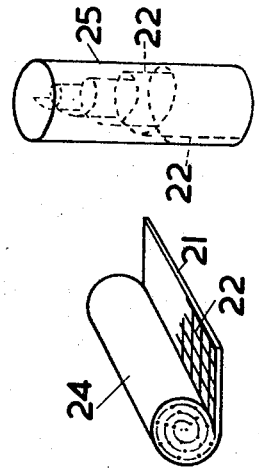
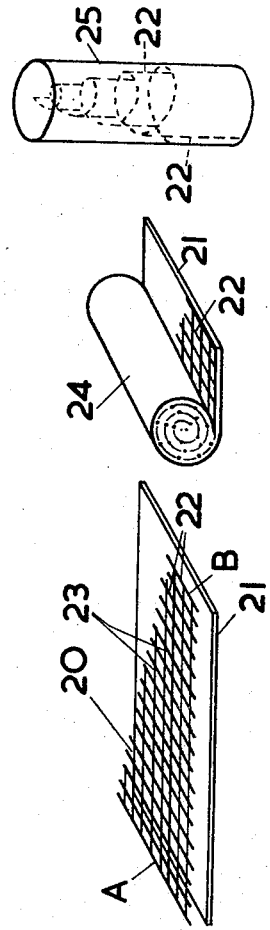
Peter Joseph Edward Forsyth
Ronald Walter George
Dennis Arthur Ryder
Inventors
By
Stevens, Davis, Miller & Mosher, Attorneys March 5, 1968
P. J. E. FORSYTH ETAL
METHOD OF PRODUCING A COMPOSITE
METALLIC MATERIAL BILLET
3,371,407
Filed Feb. 15, 1965
2 Sheets-Sheet 2
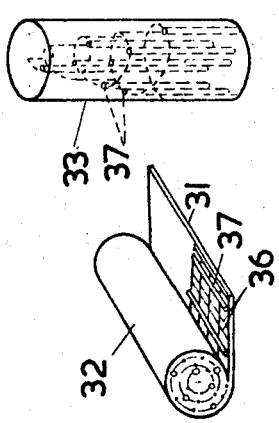
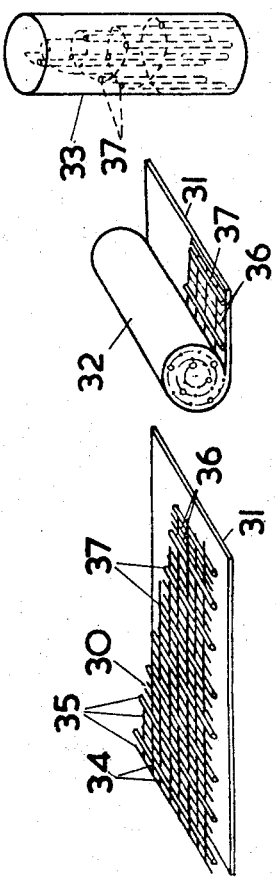
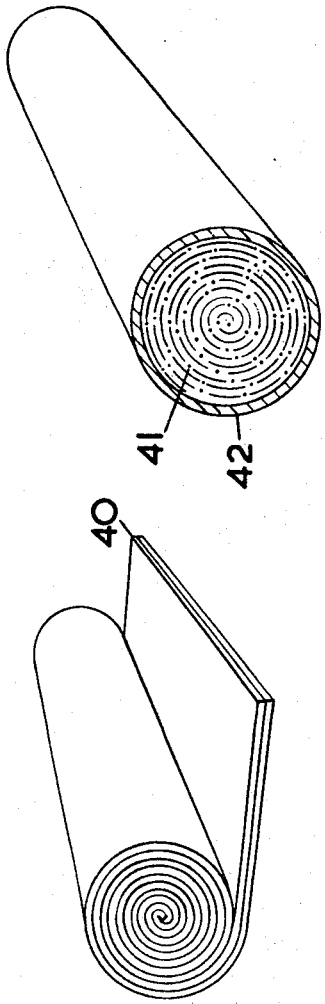
Peter Joseph Edward Forsyth
Ronald Walter George
Dennis Arthur Ryder
Inventors
By
Stevens, Davis, Miller & Mosher, Attorneys 3,371,407
METHOD OF PRODUCING A COMPOSITE
METALLIC MATERIAL BILLET
Peter Joseph Edward Forsyth, Farnham, Ronald Walter
George, Farnborough, and Dennis Arthur Ryder, Macclesfield, England, assignors to Power Jets (Research and Development) Limited, London, England, a British company
Filed Feb. 15, 1965, Ser. No. 432,781
Claims priority, application Great Britain, Feb. 21, 1964, 7,362/64
6 Claims. (Cl. 29—475)

ABSTRACT OF THE DISCLOSURE

A method of producing in billet form a composite metallic material in which high strength reinforcing elements are embedded within a low strength matrix material and in a desired density or pattern. The reinforcing elements are contained in a reinforcing layer which is placed on a layer of matrix material. The assembly is rolled-up and heated under pressure to convert it into billet form. The reinforcing layer is conveniently of a mesh or woven nature, the reinforcing elements being held and located by cross threads of a material which combines with the matrix material during the hot compacting treatment.

---

This invention relates to composite metallic structural material.

It is well known that some physical properties of homogeneous, or even many composite, materials often cannot be fully exploited because of the limitations of other properties inherent in the materials and which become apparent in its use. For example strength/weight ratio, fatigue life and elevated temperature properties i.e. hot strength and creep resistance, are all inter-related.

With a view to overcoming some of the above mentioned limitations composite metallic materials having special properties have previously been proposed, for example, it is known that sandwich sheet materials in which the centre layer has the greatest ductility have greater fatigue resistance than noncomposite sheet material. Also, for example, it is known that the inclusion in a metallic matrix of high strength wires gives increased strength/weight ratio, resistance to fatigue and/or creep.

Hitherto such composite material has been proposed mainly in sheet form thereby restricting the scope and use of the material for production purposes.

According to the present invention a method of producing a composite metallic structural material comprises assembling a layer of matrix material and a reinforcing layer one on another, the assembled layers being rolled up into substantially cylindrical form and then subjected to heat and pressure to convert the assembly into a billet in which material of the reinforcing layer is contained in the matrix material.

In the composite material the reinforcing layer may be shaped prior to its assembly with the matrix layer to give the desired distribution of reinforcement.

One form of reinforcing layer may comprise high strength wires or other elongated elements which are positioned parallel to the longitudinal axis of the billet. A particular preferred distribution of the reinforcement may be achieved by incorporating a reinforcing layer built up of high strength wires of different lengths.

The reinforcing layer may conveniently be in woven or other mesh form, the mesh having elements of high strength material extending axially of the billet and elements of relatively low strength material extending transversely thereof. Some of the elements may be of a material which will alloy with the matrix material during a process step subsequent to the assembly of the roll. Usually the transverse elements will be of the alloying material.

In an alternative form of the reinforcing mesh, some of the high strength elements may be tubular and act to improve further the specific strength and modulus of elasticity of the resultant composite material. Such tubular elements may also serve for cooling purposes in articles produced from the material.

In certain cases the high strength reinforcing elements may be coated with a metal which will diffuse into and alloy with the matrix material to strengthen it upon heat treatment subsequent to initial hot forming. The elements may be coated by a hot dipping process, electroplating or any other suitable means.

Another form of the reinforcing layer may consist of a continuous layer of a less ductile higher strength material, the layers then being rolled up as before. The resulting billet includes the more ductile material of the matrix interleaved spirally with the less ductile layer about the longitudinal axis of the billet.

The several preceding features can be combined to produce composite material billets in the production of which layers of different alloy compositions are interleaved either with or without elongated element reinforcing layers. Such combinations make possible the production of various composite billets each having individual physical properties dependent on the arrangement and type of layers used in the initial assembly.

In each of the above methods the billet formed from the assembled layers may be covered with a layer of the matrix material, or an alloy thereof, prior to the hot forming process, for example, they may be inserted into a tube of such material.

Generally it is to be understood that a welding process may be used to join together the various component members of the composite material at any stage of the assembling or forming procedure.

Several examples of the invention will now be described by way of illustration only with reference to the accompanying diagrammatic drawings as follows:

FIGURES 1, 2 and 3 illustrate Example I in which a sequence of steps in the general method of the invention for producing composite metallic billets is shown, FIGURES 4, 5 and 6 illustrate Example II which is how the method described in Example I may be used to position strategically the reinforcement in a composite material.

FIGURES 7, 8, and 9 illustrate Example III which is the inclusion of tubular elongated elements in the reinforcement, FIGURE 10 illustrates Example IV and corresponds to Example I and FIGURE 11 illustrates how the rolled up assemblies of FIGURES 2, 5, 8 or 10 may be provided with a covering layer.

Referring to FIGURES 1, 2 and 3 a layer of matrix material 10 and a reinforcing layer 11 are assembled together with the layer 11 uppermost (FIGURE 1).

The reinforcing layer 11 is a woven mesh made up of high strength wires 12 and low strength alloy wires 13. The material of the low strength wires 13 is one which will readily alloy with the material of the matrix layer 10.

The assembled layers 10 and 11 are then rolled-up to form a roll 14 as shown in FIGURE 2. This rolling is best done mechanically because an even tension can then be maintained throughout the length of the layers as they are rolled up. It should be noted that the high strength wires 12 are parallel to the longitudinal axis of the roll 14, also that the low strength wires 13 bend easily to facilitate the rolling-up of the layers.

The roll 14 is then hot formed into a cylindrical billet 15 containing the high strength wires 12 embedded in the matrix and distributed spirally within it as shown in the transverse cross section of FIGURE 3. The matrix is, of course, the layer 10 and the wires 13 alloyed together.

Example II, which is illustrated by FIGURES 4, 5 and 6 uses the method of Example I to position strategically the reinforcement within the billet of composite material. As before, the reinforcing layer 20 (FIGURE 4) is placed on a layer of matrix material 21. The reinforcing layer 20, as before, is of woven mesh form and has high strength wires 22 and low strength wires 23. The layer 20 was shaped so that the high strength wires 22 varied in length linearly from a maximum at one end A of the layer to a minimum at the other end B. When first the roll 24, and then the billet 25 had been formed (FIGURES 5 and 6) by the method of Example I the composite billet contained a cone of high strength wire reinforcement. This method of positioning the reinforcement can be adapted to give any combination of depth of reinforcement (axially of the billet) and wire distribution over the cross section of the billet as may be necessitated by the proposed specific use.

The reinforcing layer 20 may be shaped along its length so that the lengths of the high strength wires 22 varies in any manner desired. It will be seen, again for example, that by careful and detailed shaping of the layer 20 the reinforcement in the resultant billet can be positioned strategically in accordance with a calculated load distribution in the article to be produced from the billet.

Numerous billets have been made according to the methods of Examples I and II incorporating pure aluminium and ductile aluminium alloys as the layers of matrix material 10 and 21, and stainless steel wire as the high strength wires 12 and 22. In the various billets the wires 12 and 22 were between 0.002 in. and 0.010 in. in diameter and constituted up to 60% by volume of the billets. The wires 13 and 23 were of pure aluminium. Generally from considerations of the machinability and the degree of substantial homogeneity of the composite material it is desirable to use wire as fine as is practicable.

Example III as illustrated by FIGURES 7, 8 and 9 is an extension of the methods of Examples I and II.

Again composite material is produced by rolling-up together a reinforcing layer 30 and a layer of matrix material 31 into a roll 32 and subsequently hot forming the roll 32 into a billet 33. In this example the reinforcing layer 30 is shaped in a similar way to that of Example II and includes low strength wires 34 and high strength wires 35. The wires 35 are mainly of high strength wires 36 but contain a percentage of high strength elongated elements in the form of thick walled capillary tubes 37 distributed amongst them, a little greater in outside diameter than the wires 36.

The thick walled capillary tubes 37 may serve as cooling tubes in an article produced from the billet 33. They also improve the specific strength and modulus of elasticity of the composite material.

Billets made according to the method of Example III used the same materials as Examples I and II for the layers of matrix material 31, the wires 36 and the wires 34. The capillary tubes 37 were of stainless steel and of 0.010 in. outside diameter.

FIGURE 10 illustrates Example IV in which the method differs from that of Example I solely in that the reinforcing layer is in the form of a continuous sheet 40.

By any of the methods of Examples I, II, III or IV foils or layers of different alloy compositions can be incorporated in the final billet with or without further wire reinforcement.

Where the composite billets are to be used for the manufacture of articles by forming processes as distinct from machining it is desirable to cover the rolled up assembly with an outer layer of the matrix material, or of a material capable of alloying therewith prior to the hot forming process. See for example FIGURE 11 where a rolled up assembly 41 has a tubular covering 42. This ensures that there are no exposed wires on the surface of the final manufactured article.

Such a covering may serve to protect the billets. For example, where the matrix material is an aluminium alloy and a resistance to corrosion is required the tube 42 could be of commercially pure aluminium or of an even higher purity aluminium. If, on the other hand, resistance to abrasion is the requirement the tube could be of a ductile aluminium alloy with higher hardness.

Where predetermined properties are to be developed in the matrix material, the reinforcing layers may be coated with an alloying element which will diffuse into the matrix for this purpose. Thus in Examples I, II, III and IV it is sometimes convenient to utilize the advantages of pure aluminium for the initial hot forming of the components of the roll 14, 24, 32, 41 by using pure or substantially pure aluminium for the matrix layer 10, 21, 31 and coating the reinforcing layer 11, 20, 30, 40 with another metal which is a strengthening and alloying element of the matrix material and which diffuses and further alloys with the matrix during a subsequent heating process, thereby strengthening it. For example, a wire mesh reinforcing layer can be coated by any of the well known processes such as electroplating or hot dipping, for example with copper, zinc or silver.

A turbine or compressor blade may be made from a billet of composite material including high strength wires and high strength thick walled capillary tubes as previously described. In such blades the major stress direction is known and the method of the invention permits the making of blades with strategically placed high strength regions. In this method a suitably shaped reinforcing layer of woven mesh form and including high strength wires and high strength thick walled capillary tubes is rolled-up inside a layer of matrix material. The roll so formed is encased in a tube of a material that will alloy with the matrix material and the composite assembly hot formed into a cylindrical billet. Such a billet is taper-rolled into blade form having a smooth unbroken exterior surface with strategically positioned reinforcement and in situ cooling passages.

The basic technical advantages of composite materials made by the present invention, especially where reinforcing layers of wire or other elongated elements are used, are increased strength/weight ratio, resistance to fatigue and/or creep particularly at elevated temperatures. This improvement over known composite materials is possible because the method leads to a marked increase in the percentage volume of the reinforcing wires. Specimens have been produced containing up to approximately 60% by volume of high strength wire.

We claim:

1. A method of producing a composite metallic material billet comprising the steps of assembling a layer of matrix material and a mesh reinforcing layer having high strength elements extending in one direction and relatively low strength elements extending traversely thereof; aligning the high strength elements of the reinforcing layer in a direction so they will be substantially along the axis of the billet when rolled, rolling up the assembled layers into substantially cylindrical form, and subjecting the rolled up assembly to heat and pressure thereby converting it into a billet wherein the mesh reinforcing layer is contained within the matrix material.

2. A method according to claim 1 wherein the mesh is of a woven type.

3. A method according to claim 1 in which the reinforcing layer includes tubular elements which become aligned substantially along the axis of the billet when rolled.

4. A method according to claim 3 wherein before being subjected to heat and pressure the rolled up assembly is covered with a layer of material capable of alloying with the matrix material.

5. A method according to claim 1 wherein before being subjected to heat and pressure the rolled up assembly is covered with a layer of material the same as the matrix material.

6. A method according to claim 1 wherein before being subjected to heat and pressure the rolled up assembly is covered with a layer of material capable of alloying with the matrix material.

References Cited

UNITED STATES PATENTS

| | | | |
|---|---|---|---|
| 400,931 | 4/1889 | McCloud | 29—476.5 X |
| 1,125,163 | 1/1915 | Page | 29—187.5 X |
| 1,806,738 | 5/1931 | Burns | 29—498 X |
| 2,721,952 | 10/1955 | Kenyon | 29—493 X |
| 2,977,675 | 4/1961 | Simms | 29—498 X |
| 3,078,563 | 2/1963 | Gould | 29—497.5 X |
| 3,208,131 | 9/1965 | Ruff | 29—475 X |

OTHER REFERENCES

Procedures in Experimental Metallurgy by Seybolt and Burke, copyright 1953, pp. 225 and 232.

JOHN F. CAMPBELL, *Primary Examiner.*

R. F. DROPKIN, *Assistant Examiner.*